US009981617B1

(12) United States Patent
MacDonald et al.

(10) Patent No.: US 9,981,617 B1
(45) Date of Patent: May 29, 2018

(54) ENGINE SOUND ENHANCEMENT SYSTEMS AND METHODS USING PREDICTED VALUES

(71) Applicant: GM Global Technology Operations LLC, Detroit, MI (US)

(72) Inventors: Alexander J. MacDonald, West Bloomfield, MI (US); Michael A. Ryba, West Bloomfield, MI (US); Roger C. Barlow, Jr., Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/422,514

(22) Filed: Feb. 2, 2017

(51) Int. Cl.

| | |
|---|---|
| ***H04R 3/04*** | (2006.01) |
| ***F02D 41/10*** | (2006.01) |
| ***B60R 16/023*** | (2006.01) |
| ***F02D 41/00*** | (2006.01) |

(52) U.S. Cl.
CPC ...... *B60R 16/0231* (2013.01); *F02D 41/0087* (2013.01); *F02D 41/107* (2013.01); *H04R 3/04* (2013.01); *F02D 2200/602* (2013.01); *H04R 2430/01* (2013.01); *H04R 2499/13* (2013.01)

(58) Field of Classification Search
CPC ..... H04R 3/04; H04R 2430/01; F02D 41/107; F02D 41/0087; F02M 35/1038
USPC .......................................................... 701/36
See application file for complete search history.

(56) References Cited

PUBLICATIONS

U.S. Appl. No. 15/234,723, filed Aug. 11, 2016, Chang et al.
U.S. Appl. No. 15/220,912, filed Jul. 27, 2016, Chang et al.

*Primary Examiner* — Tan Q Nguyen

(57) ABSTRACT

An engine control module (ECM): based on an accelerator pedal position measured using an accelerator pedal position sensor, determines at least one of a predicted engine speed and a predicted torque output of an engine; and transmits the at least one of the predicted engine speed and the predicted engine to a network bus. An audio control module: is separate from the ECM; obtains the at least one of the predicted engine speed and the predicted torque output from the network bus; based on the at least one of the predicted engine speed and the predicted torque output, sets at least one of a frequency at which to output a predetermined engine sound and a magnitude for outputting the predetermined engine sound at the frequency; and applies power to at least one speaker of the vehicle to output the predetermined engine sound at the frequency and the magnitude.

20 Claims, 6 Drawing Sheets

ENGINE SOUND ENHANCEMENT SYSTEMS AND METHODS USING PREDICTED VALUES

FIELD

The present disclosure relates to vehicle sound systems and more particularly systems and methods for enhancing engine sound based on predicted engine speed and/or predicted engine torque.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some motor vehicles include conventional powertrains having an internal combustion engine and a drivetrain that normally emit sounds during acceleration events, deceleration events, and gear changes. Many consumers have come to rely on these normal sounds as a sign of proper vehicle function. Changes in these normal sounds may indicate, to certain consumers, that the internal combustion engine and/or the drivetrain may be functioning differently than expected.

Some consumers may have expectations as to what the normal sounds of different types of vehicle should be. For example, a consumer may expect certain sounds from "high performance" vehicles, while some sounds may not be expected from other types of vehicles. An absence of expected sounds may detract from a user's enjoyment of a vehicle.

SUMMARY

In a feature, an engine sound enhancement system of a vehicle includes an engine control module (ECM) that: based on an accelerator pedal position measured using an accelerator pedal position sensor, determines at least one of a predicted engine speed and a predicted torque output of an engine; selectively actuates at least one engine actuator of the vehicle based on the at least one of the predicted engine speed and the predicted torque output; and transmits the at least one of the predicted engine speed and the predicted engine to a network bus. An audio control module: is separate from the ECM; obtains the at least one of the predicted engine speed and the predicted torque output from the network bus; based on the at least one of the predicted engine speed and the predicted torque output, sets at least one of: (i) a frequency at which to output a predetermined engine sound; and (ii) a magnitude for outputting the predetermined engine sound at the frequency; and applies power to at least one speaker of the vehicle to output the predetermined engine sound at the frequency and the magnitude.

In further features, the at least one speaker outputs sound within a passenger cabin of the vehicle.

In further features, the audio control module: when the predicted engine speed is a first engine speed, sets: (i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed, sets: (i) the frequency at which to output the predetermined engine sound to a second frequency that is greater than the second frequency; and (ii) the magnitude for outputting the predetermined engine sound at the frequency to the first magnitude.

In further features, the audio control module: when the predicted torque output is a first torque, sets: (i) the frequency at which to output the predetermined engine sound to a first frequency; and (ii) the magnitude for outputting the predetermined engine sound at the frequency to a first magnitude; and when the predicted torque output is a second torque that is greater than the first torque, sets: (i) the frequency at which to output the predetermined engine sound to a second frequency that is greater than the second frequency; and (ii) the magnitude for outputting the predetermined engine sound at the frequency to the first magnitude.

In further features, the audio control module: when the predicted engine speed is a first engine speed, sets: (i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed, sets: (i) the frequency at which to output the predetermined engine sound to the first frequency; and (ii) the magnitude for outputting the predetermined engine sound at the frequency to a second magnitude that is greater than the first magnitude.

In further features, the audio control module: when the predicted torque output is a first torque, sets: (i) the frequency at which to output the predetermined engine sound to a first frequency; and (ii) the magnitude for outputting the predetermined engine sound at the frequency to a first magnitude; and when the predicted torque output is a second torque that is greater than the first torque, sets: (i) the frequency at which to output the predetermined engine sound to the first frequency; and (ii) the magnitude for outputting the predetermined engine sound at the frequency to a second magnitude that is greater than the first magnitude.

In further features, the audio control module: when the predicted engine speed is a first engine speed, sets: (i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed: (i) sets the frequency at which to output the predetermined engine sound to the first frequency; (ii) sets the magnitude for outputting the predetermined engine sound at the frequency to the first magnitude; (iii) sets a second frequency at which to output the predetermined engine sound to greater than the first frequency; (iv) sets a second magnitude for outputting the predetermined engine sound at the second frequency; and (v) applies power to the at least one speaker of the vehicle to output the predetermined engine sound further at the second frequency and the second magnitude.

In further features, the audio control module: when the predicted torque output is a first torque, sets: (i) the frequency at which to output the predetermined engine sound to a first frequency; and (ii) the magnitude for outputting the predetermined engine sound at the frequency to a first magnitude; and when the predicted torque output is a second torque that is greater than the first torque: (i) sets the frequency at which to output the predetermined engine sound to the first frequency; (ii) sets the magnitude for outputting the predetermined engine sound at the frequency to the first magnitude; (iii) sets a second frequency at which to output the predetermined engine sound to greater than the first frequency; (iv) sets a second magnitude for outputting the predetermined engine sound at the second frequency; and (v) applies power to the at least one speaker of the vehicle to output the predetermined engine sound further at the second frequency and the second magnitude.

In further features, the audio control module: when the predicted engine speed is a first engine speed, sets: (i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed, sets: (i) the frequency at which to output the predetermined engine sound to a second frequency that is greater than the second frequency; and (ii) the magnitude for outputting the predetermined engine sound at the frequency to a second magnitude that is greater than the first magnitude.

In further features, the ECM: determines a measured engine speed based on a crankshaft position measured using a crankshaft position sensor; actuates the at least one engine actuator to change the measured engine speed in response to a change in the accelerator pedal position; and before the change in the measured engine speed, in response to the change in the accelerator pedal position, changes the at least one of the predicted engine speed and the predicted torque output.

In a feature, an engine sound enhancement method for a vehicle includes: by an engine control module (ECM): based on an accelerator pedal position measured using an accelerator pedal position sensor, determining at least one of a predicted engine speed and a predicted torque output of an engine; selectively actuating at least one engine actuator of the vehicle based on the at least one of the predicted engine speed and the predicted torque output; and transmitting the at least one of the predicted engine speed and the predicted engine to a network bus; by an audio control module that is separate from the ECM: obtaining the at least one of the predicted engine speed and the predicted torque output from the network bus; based on the at least one of the predicted engine speed and the predicted torque output, setting at least one of: (i) a frequency at which to output a predetermined engine sound; and (ii) a magnitude for outputting the predetermined engine sound at the frequency; and applying power to at least one speaker of the vehicle to output the predetermined engine sound at the frequency and the magnitude.

In further features, the at least one speaker outputs sound within a passenger cabin of the vehicle.

In further features, setting at least one of (i) the frequency at which to output a predetermined engine sound and (ii) the magnitude for outputting the predetermined engine sound at the frequency includes: when the predicted engine speed is a first engine speed, setting: (i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed, setting: (i) the frequency at which to output the predetermined engine sound to a second frequency that is greater than the second frequency; and (ii) the magnitude for outputting the predetermined engine sound at the frequency to the first magnitude.

In further features, setting at least one of (i) the frequency at which to output a predetermined engine sound and (ii) the magnitude for outputting the predetermined engine sound at the frequency includes: when the predicted torque output is a first torque, setting: (i) the frequency at which to output the predetermined engine sound to a first frequency; and (ii) the magnitude for outputting the predetermined engine sound at the frequency to a first magnitude; and when the predicted torque output is a second torque that is greater than the first torque, setting: (i) the frequency at which to output the predetermined engine sound to a second frequency that is greater than the second frequency; and (ii) the magnitude for outputting the predetermined engine sound at the frequency to the first magnitude.

In further features, setting at least one of (i) the frequency at which to output a predetermined engine sound and (ii) the magnitude for outputting the predetermined engine sound at the frequency includes: when the predicted engine speed is a first engine speed, setting: (i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed, setting: (i) the frequency at which to output the predetermined engine sound to the first frequency; and (ii) the magnitude for outputting the predetermined engine sound at the frequency to a second magnitude that is greater than the first magnitude.

In further features, setting at least one of (i) the frequency at which to output a predetermined engine sound and (ii) the magnitude for outputting the predetermined engine sound at the frequency includes: when the predicted torque output is a first torque, setting: (i) the frequency at which to output the predetermined engine sound to a first frequency; and (ii) the magnitude for outputting the predetermined engine sound at the frequency to a first magnitude; and when the predicted torque output is a second torque that is greater than the first torque, setting: (i) the frequency at which to output the predetermined engine sound to the first frequency; and (ii) the magnitude for outputting the predetermined engine sound at the frequency to a second magnitude that is greater than the first magnitude.

In further features, setting at least one of (i) the frequency at which to output a predetermined engine sound and (ii) the magnitude for outputting the predetermined engine sound at the frequency includes: when the predicted engine speed is a first engine speed, setting: (i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed: (i) setting the frequency at which to output the predetermined engine sound to the first frequency; (ii) setting the magnitude for outputting the predetermined engine sound at the frequency to the first magnitude; (iii) setting a second frequency at which to output the predetermined engine sound to greater than the first frequency; (iv) setting a second magnitude for outputting the predetermined engine sound at the second frequency; and (v) applying power to the at least one speaker of the vehicle to output the predetermined engine sound further at the second frequency and the second magnitude.

In further features, setting at least one of (i) the frequency at which to output a predetermined engine sound and (ii) the magnitude for outputting the predetermined engine sound at the frequency includes: when the predicted torque output is a first torque, setting: (i) the frequency at which to output the predetermined engine sound to a first frequency; and (ii) the magnitude for outputting the predetermined engine sound at the frequency to a first magnitude; and when the predicted torque output is a second torque that is greater than the first torque: (i) setting the frequency at which to output the predetermined engine sound to the first frequency; (ii) setting the magnitude for outputting the predetermined engine sound at the frequency to the first magnitude; (iii) setting a second frequency at which to output the predetermined engine sound to greater than the first frequency; (iv) setting a second magnitude for outputting the predetermined engine sound at the second frequency; and (v) applying power to the at least one speaker of the vehicle to output the predetermined engine sound further at the second frequency and the second magnitude.

In further features, setting at least one of (i) the frequency at which to output a predetermined engine sound and (ii) the magnitude for outputting the predetermined engine sound at the frequency includes: when the predicted engine speed is a first engine speed, setting: (i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed, setting: (i) the frequency at which to output the predetermined engine sound to a second frequency that is greater than the second frequency; and (ii) the magnitude for outputting the predetermined engine sound at the frequency to a second magnitude that is greater than the first magnitude.

In further features, by the ECM, further: determining a measured engine speed based on a crankshaft position measured using a crankshaft position sensor; actuating the at least one engine actuator to change the measured engine speed in response to a change in the accelerator pedal position; and before the change in the measured engine speed, in response to the change in the accelerator pedal position, changing the at least one of the predicted engine speed and the predicted torque output.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

and

Figure 6:
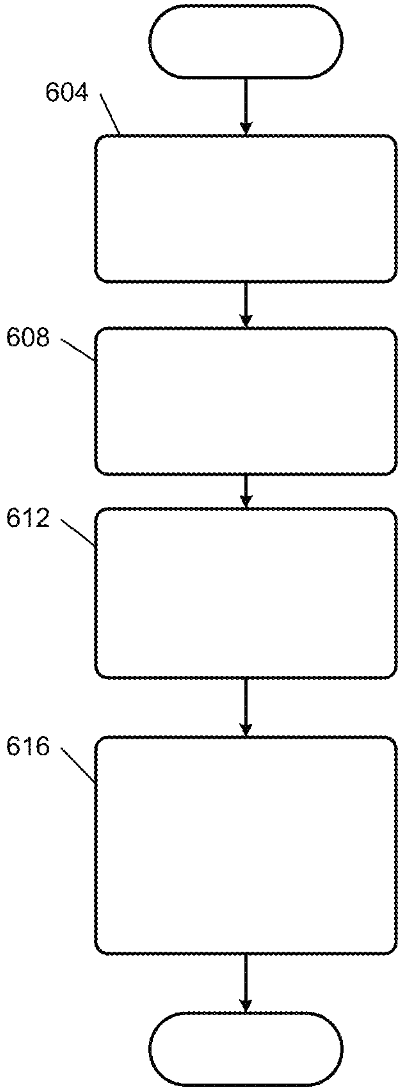

FIG. 6 is a flowchart depicting an example method of generating sound to enhance engine sound based on predicted engine speed and/or predicted engine torque.

In the drawings, reference numbers may be reused to identify similar and/or identical elements.

DETAILED DESCRIPTION

An engine control module (ECM) controls torque output of an engine. More specifically, the ECM controls actuators of the engine based on target values, respectively, selected based on a requested amount of torque. An audio control module generates sound via one or more speakers of the vehicle. For example, the audio control module drives the speaker(s) to generate predetermined engine sounds.

The audio control module could drive the speakers to generate the predetermined engine sounds based on a measured engine speed and/or a measured torque output of the engine transmitted to the audio control module by the ECM via a network. However, predetermined engine sounds generated based on the measured engine speed and/or the measured torque output may be perceived by a driver as being too delayed relative to the accelerator pedal actuation by the driver. The delay may be attributable to, for example, delay between driver actuation of the accelerator pedal and the resulting change in measured engine speed and/or torque output, delay associated with communication from the ECM to the audio control module, and one or more other delays.

According to the present disclosure, the audio control module generates the predetermined engine sounds via the speaker(s) based on a predicted engine speed and/or a predicted engine torque determined by the ECM. The ECM may increase the predicted engine speed and the predicted torque output as accelerator pedal position increases and vice versa. The ECM changes the predicted engine speed and the predicted torque output in response to a change in the accelerator pedal position, however, sooner than the measured engine speed and the measured torque output change in response to that change in the accelerator pedal position. Thus, the predetermined engine sounds output via the speaker(s) occur more closely in time with when the driver may expect the predetermined engine sounds. This improves driver perception of the vehicle and/or vehicle performance relative to the use of the measured engine speed and/or the measured torque output.

Figure 1:
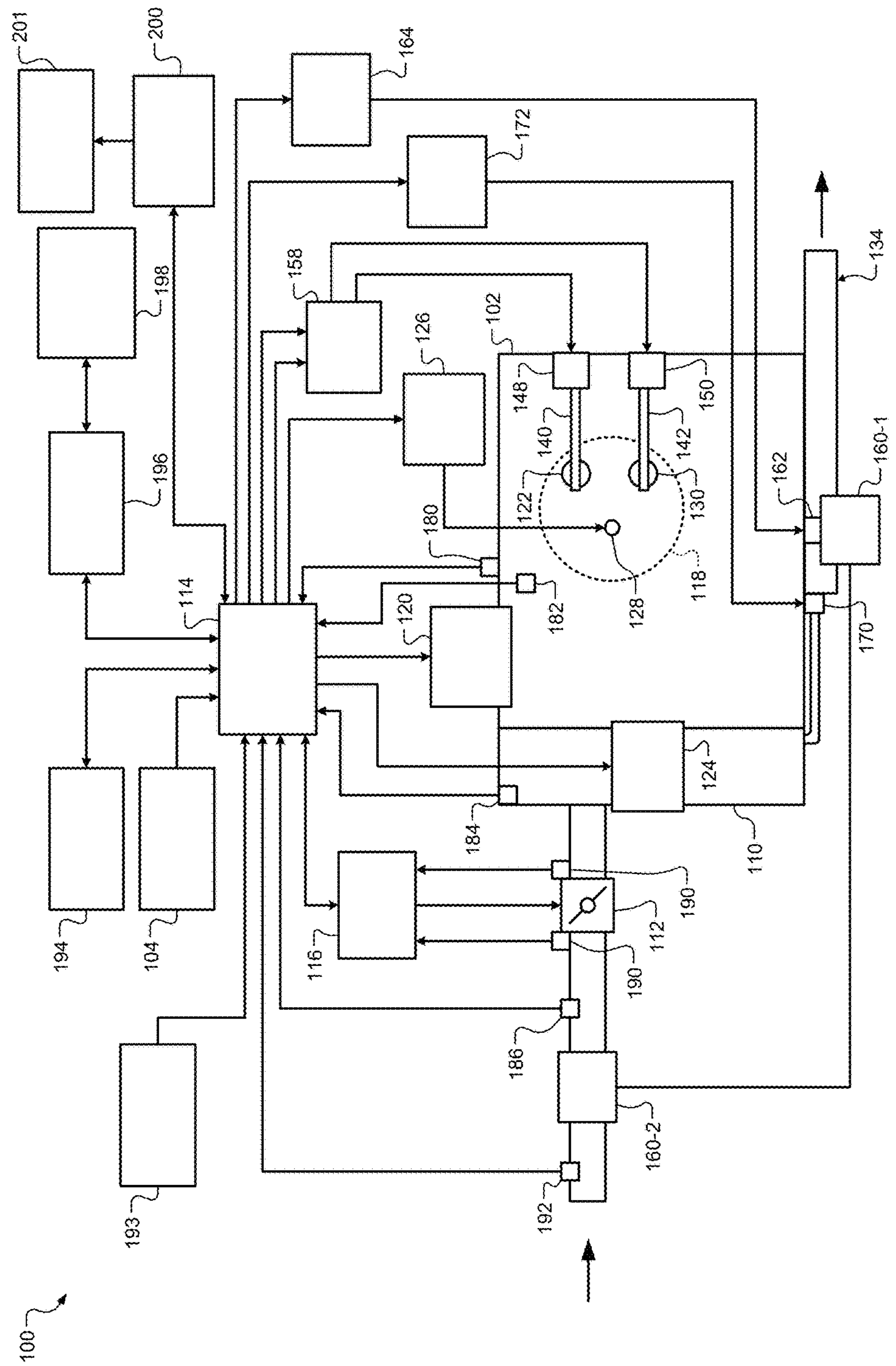
FIG. 1 is a functional block diagram including an engine system and a sound system of a vehicle.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194, for example, to coordinate engine operation with gear shifts in a transmission. The ECM 114 may communicate with a hybrid control module 196, for example, to coordinate operation of the engine 102 and a motor generator unit (MGU) 198. While the example of one MGU is provided, multiple MGUs and/or electric motors may be implemented. The terms MGU and electric motor may be interchangeable in the context of the present application, drawings, and claims. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the MGU 198 to output torque, for example, to supplement engine torque output. For example, the hybrid control module 196 may control the MGU 198 to output (positive) torque when the torque request is greater than a predetermined torque, when the APP is greater than a predetermined position, or when the driver is rapidly depressing the accelerator pedal. The predetermined torque may be calibrated and may be, for example, at least a predetermined fraction of a maximum possible torque output of the engine 102 under the present operating conditions. The predetermined fraction may be calibratable, is greater than zero, and may be, for example, approximately 80 percent, approximately 90 percent, or another suitable value that is greater than 50 percent of the maximum possible torque output of the engine 102.

The hybrid control module 196 applies electrical power from a battery to the MGU 198 to cause the MGU 198 to output positive torque. While the example of the battery is provided, more than one battery may be used to supply power to the MGU 198. The MGU 198 may output torque, for example, to the engine 102, to an input shaft of the transmission, to an output shaft of the transmission, or to another torque transfer device of the powertrain of the vehicle. The battery may be dedicated for the MGU 198 and one or more other batteries may supply power for other vehicle functions.

Under other circumstances, the hybrid control module 196 may control the MGU 198 to convert mechanical energy of the vehicle into electrical energy. The hybrid control module 196 may control the MGU 198 to convert mechanical energy into electrical energy, for example, to recharge the battery. This may be referred to as regeneration.

The vehicle also includes an audio control module 200 that controls sound output via a speaker 201. While the example of the speaker 201 is provided, the speaker 201 may be representative of one or more speakers. The speaker 201 may be within the passenger cabin of the vehicle and/or of the exhaust system 134. The audio control module 200 may control the speaker 201 to output sound based on received amplitude modulation (AM) signals, received frequency modulation (FM) signals, received satellite signals, and other types of audio signals. The audio control module 200 may be implemented, for example, with an infotainment system.

The audio control module 200 may receive parameters from the ECM 114, the hybrid control module 196, the transmission control module 194, and/or one or more other control modules of the vehicle. The audio control module 200 may receive parameters from other modules, for example, via a controller area network (CAN) bus or another suitable type of network bus. As discussed further below, the audio control module 200 may determine when and the extent to which to output sound for based on one or more of the received parameters. For example, the audio control module 200 may set frequencies and/or magnitudes for outputting one or more predetermined engine sounds to enhance engine sound output based on a predicted engine speed and/or a predicted torque output of the engine 102. The audio control module 200 may receive the predicted engine speed and the predicted torque output from the ECM 114.

Figure 2:
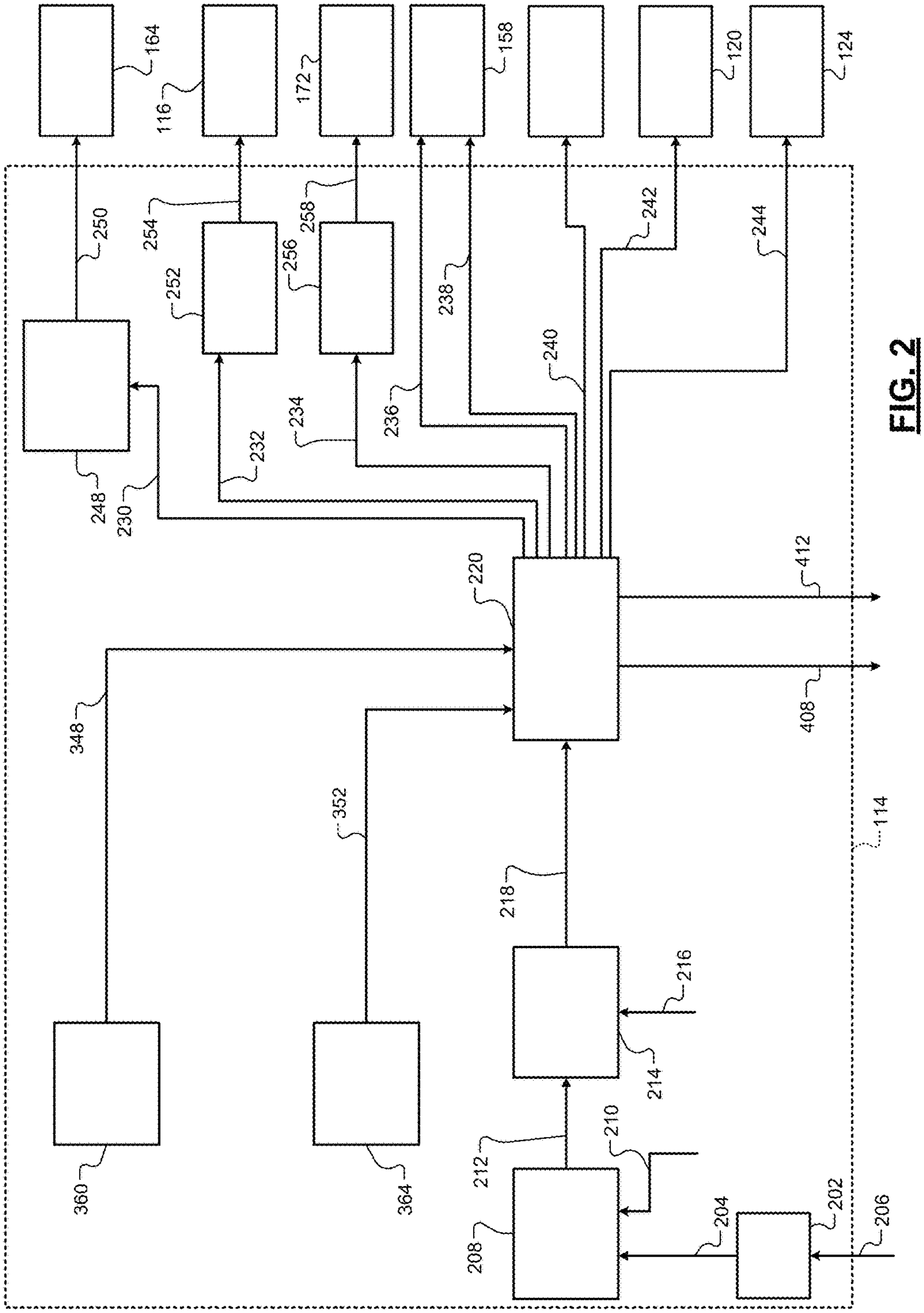
FIG. 2 is a functional block diagram including an example implementation of an engine control module (ECM)

Referring now to FIG. 2, a functional block diagram of an example engine control system is presented. A driver torque module 202 determines a driver torque request 204 based on a driver input 206 from the driver input module 104. The driver input 206 may be based on, for example, a position of an accelerator pedal and a position of a brake pedal. The driver input 206 may also be based on cruise control, which may be an adaptive cruise control system that varies vehicle speed to maintain a predetermined following distance. The driver torque module 202 may store one or more mappings of driver input (e.g., accelerator pedal position) to target torque and may determine the driver torque request 204 using a selected one of the mappings. The driver torque module 202 may also apply one or more filters to rate limit changes in the driver torque request 204.

An axle torque arbitration module 208 arbitrates between the driver torque request 204 and other axle torque requests 210. Axle torque (torque at the wheels) may be produced by various sources including the engine 102 and/or the MGU 198. The axle torque requests 210 may include, for example, a torque reduction requested by a traction control system when positive wheel slip is detected. Positive wheel slip occurs when axle torque overcomes friction between the wheels and the road surface, and the wheels begin to slip against the road surface. The axle torque requests 210 may also include a torque increase request to counteract negative wheel slip, where a tire of the vehicle slips in the other direction with respect to the road surface because the axle torque is negative.

The axle torque requests 210 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 210 may also be generated by vehicle stability control systems.

The axle torque arbitration module 208 outputs an axle torque request 212 based on the results of arbitrating between the received axle torque requests 204 and 210. As described below, the axle torque request 212 from the axle torque arbitration module 208 may selectively be adjusted by other modules of the ECM 114 before being used to control the engine actuators.

The axle torque arbitration module 208 may output the axle torque request 212 to a propulsion torque arbitration module 214. In various implementations, the axle torque arbitration module 208 may output the axle torque request 212 to a hybrid optimization module (not shown). The hybrid optimization module may determine how much torque should be produced by the engine 102 and how much torque should be produced by the MGU 198. The hybrid optimization module then outputs a modified torque request to the propulsion torque arbitration module 214.

The propulsion torque arbitration module 214 converts the axle torque request 212 from an axle torque domain (torque at the wheels) into a propulsion torque domain (torque at the crankshaft). The propulsion torque arbitration module 214 arbitrates between the (converted) axle torque request 212 and other propulsion torque requests 216. The propulsion torque arbitration module 214 generates a propulsion torque request 218 as a result of the arbitration.

For example, the propulsion torque requests 216 may include torque reductions for engine over-speed protection, torque increases for stall prevention, and torque reductions requested by the transmission control module 194 to accommodate gear shifts. The propulsion torque requests 216 may also result from clutch fuel cutoff, which reduces the engine output torque when the driver depresses the clutch pedal in a manual transmission vehicle to prevent a flare in engine speed.

The propulsion torque requests 216 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 214 may output zero as the propulsion torque request 218.

In various implementations, an engine shutoff request may simply shut down the engine 102 separately from the arbitration process. The propulsion torque arbitration module 214 may still receive the engine shutoff request so that, for example, appropriate data can be fed back to other torque requestors. For example, all other torque requestors may be informed that they have lost arbitration.

A target generating module 220 (see also FIG. 3) generates target values for the engine actuators based on the propulsion torque request 218 and other parameters as discussed further below. The target generating module 220 generates the target values using model predictive control (MPC). The propulsion torque request 218 may be a brake torque. Brake torque may refer to torque at the crankshaft under the current operating conditions.

The target values include a target wastegate opening area 230, a target throttle opening area 232, a target EGR opening area 234, a target intake cam phaser angle 236, and a target exhaust cam phaser angle 238. The target values may also include a target spark timing 240, a target number of cylinders to be activated 242, and target fueling parameters 244. The boost actuator module 164 controls the wastegate 162 to achieve the target wastegate opening area 230. For example, a first conversion module 248 may convert the target wastegate opening area 230 into a target duty cycle 250 to be applied to the wastegate 162, and the boost actuator module 164 may apply a signal to the wastegate 162 based on the target duty cycle 250. In various implementations, the first conversion module 248 may convert the target wastegate opening area 230 into a target wastegate position (not shown), and convert the target wastegate position into the target duty cycle 250.

The throttle actuator module 116 controls the throttle valve 112 to achieve the target throttle opening area 232. For example, a second conversion module 252 may convert the target throttle opening area 232 into a target duty cycle 254 to be applied to the throttle valve 112, and the throttle actuator module 116 may apply a signal to the throttle valve 112 based on the target duty cycle 254. In various implementations, the second conversion module 252 may convert the target throttle opening area 232 into a target throttle position (not shown), and convert the target throttle position into the target duty cycle 254.

The EGR actuator module 172 controls the EGR valve 170 to achieve the target EGR opening area 234. For example, a third conversion module 256 may convert the target EGR opening area 234 into a target duty cycle 258 to be applied to the EGR valve 170, and the EGR actuator module 172 may apply a signal to the EGR valve 170 based on the target duty cycle 258. In various implementations, the third conversion module 256 may convert the target EGR opening area 234 into a target EGR position (not shown), and convert the target EGR position into the target duty cycle 258.

The phaser actuator module 158 controls the intake cam phaser 148 to achieve the target intake cam phaser angle 236. The phaser actuator module 158 also controls the exhaust cam phaser 150 to achieve the target exhaust cam phaser angle 238. In various implementations, a fourth conversion module (not shown) may be included and may convert the target intake and exhaust cam phaser angles 236 and 238 into target intake and exhaust duty cycles, respectively. The phaser actuator module 158 may apply the target intake and exhaust duty cycles to the intake and exhaust cam phasers 148 and 150, respectively. In various implementations, the target generating module 220 may (instead of the target intake exhaust cam phaser angles) determine a target valve overlap factor and a target effective displacement, and the phaser actuator module 158 may control the intake and exhaust cam phasers 148 and 150 to achieve the target overlap factor and the target effective displacement.

The spark actuator module 126 provides spark based on the target spark timing 240. In various implementations, the target generating module 220 may generate a target combustion phasing value, such as a target crankshaft angle where 50 percent of a provided mass of fuel will be burned (CA50). The target spark timing may be determined based on the target combustion phasing value and an estimated burn duration. The estimated burn duration may be determined, for example, based on APC, humidity, dilution, and temperature of air within a cylinder. Alternatively, the target generating module 220 may determine a target torque decrease, and the target spark timing 240 may be determined based on how far to retard the spark timing relative to an optimal spark timing to achieve the target torque decrease.

The cylinder actuator module 120 selectively activates and deactivates the valves of cylinders based on the target number of cylinders 242. Fueling and spark may also be disabled to cylinders that are deactivated. The target fueling parameters 244 may include, for example, target mass of fuel, target injection starting timing, and target number of fuel injections. The fuel actuator module 124 controls fueling based on the target fueling parameters 244.

Figure 3:
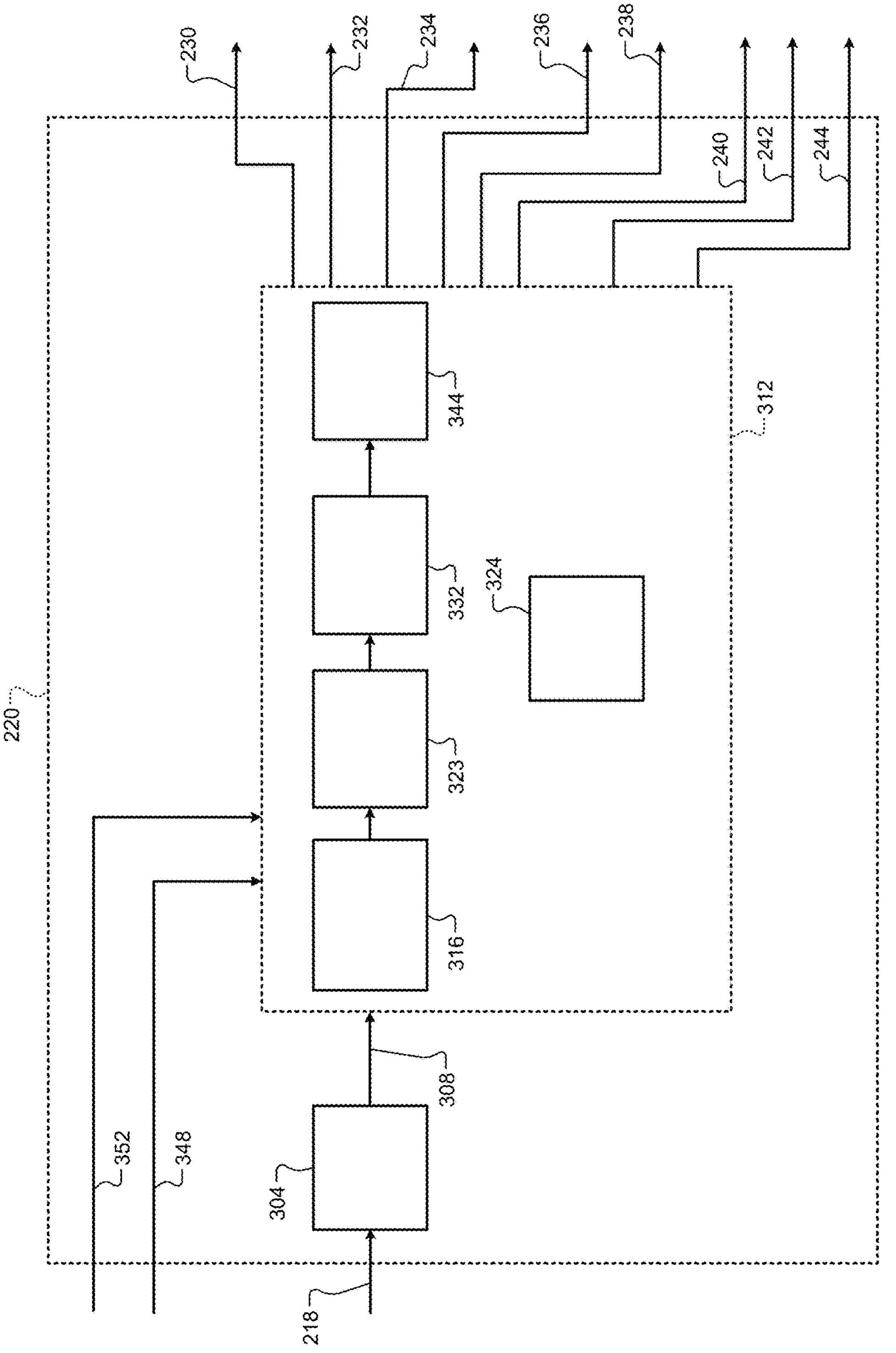
FIG. 3 is a functional block diagram including an example implementation of a target generating module.

FIG. 3 is a functional block diagram of an example implementation of the target generating module 220. Referring now to FIGS. 2 and 3, as discussed above, the propulsion torque request 218 may be a brake torque. A torque conversion module 304 converts the propulsion torque request 218 from brake torque into a base torque. The torque request resulting from conversion into base torque will be referred to as a base torque request 308.

Base torques may refer to torque at the crankshaft made during operation of the engine 102 on a dynamometer while the engine 102 is warm and no torque loads are imposed on the engine 102 by accessories, such as an alternator and the A/C compressor. The torque conversion module 304 may convert the propulsion torque request 218 into the base torque request 308, for example, using one or more mappings or functions that relate brake torques to base torques. Lookup tables are examples of mappings, and equations are examples of functions. In various implementations, the torque conversion module 304 may convert the propulsion torque request 218 into another suitable type of torque, such as an indicated torque. An indicated torque may refer to a torque at the crankshaft attributable to work produced via combustion within the cylinders.

An MPC (model predictive control) module 312 generates the target values 230-244 using MPC. The MPC module 312 may be a single module or may comprise multiple modules. For example, the MPC module 312 may include a sequence determination module 316. The sequence determination module 316 determines possible sequences of the target values 230-244 that could be used together during N future control loops.

Each of the possible sequences identified by the sequence determination module 316 includes one sequence of N values for each of the target values 230-244. In other words, each possible sequence includes a sequence of N values for the target wastegate opening area 230, a sequence of N values for the target throttle opening area 232, a sequence of N values for the target EGR opening area 234, a sequence of N values for the target intake cam phaser angle 236, and a sequence of N values for the target exhaust cam phaser angle 238. Each possible sequence may also include a sequence of N values for the target spark timing 240, the target number of cylinders 242, and the target fueling parameters 244. Each of the N values are for a corresponding one of the next N future control loops. N is an integer greater than one. The period of time defined by the N future control loops may be referred to as a control horizon.

A prediction module 323 determines predicted responses of the engine 102 to the possible sequences of the target values 230-244, respectively, based on a mathematical model 324 of the engine 102. The prediction module 323 generates the predicted responses for each of the possible sequences of the target values 230-244. For example, based on a possible sequence of the target values 230-244, using the model 324, the prediction module 323 generates a sequence of M predicted torques of the engine 102 for M of the N future control loops, a sequence of M predicted engine speeds for the M future control loops, and a sequence of M predicted MAPs for the M future control loops. While an example of generating predicted torque, predicted engine speed, and predicted MAP is described, the predicted parameters may include one or more other predicted operating parameters. The period of time defined by the next M future control loops may be referred to as a prediction horizon. M is an integer that is greater than or equal to N. As such, the prediction horizon is greater than or equal to the control horizon. The model 324 may include, for example, one or more functions or mappings calibrated based on characteristics of the engine 102.

The prediction module 323 may generate the predicted parameters for a given sequence of possible target values based on the relationships:

$$x(k+1)=Ax(k)+Bu(k);\text{ and}$$

$$y(k)=Cx(k),$$

where x(k+1) is a vector with entries indicative of states of the engine 102 for a next control loop k+1, A is a matrix including constant values calibrated based on characteristics of the engine 102, x(k) is a vector with entries indicative of states of the engine 102 for the k-th control loop, B is a matrix including constant values calibrated based on characteristics of the engine 102, u(k) is a vector of including entries for the possible target values for the k-th control loop, y(k) is a vector including the predicted parameters for the k-th control loop, and C is a matrix including constant values calibrated based on characteristics of the engine 102. The vector x(k+1) determined during for the k-th control loop will be used as the vector x(k) for the next control loop k+1. The prediction module 323 generates the predicted parameters for each of M of the N future control loops, where M is an integer that is greater than zero and greater than or equal to N (i.e., k=0, 1, . . . M). The relationships can also be written as:

$$x(k)=Ax(k-1)+Bu(k-1);\text{ and}$$

$$y(k)=Cx(k),$$

where k is a control loop, x(k−1) is a vector with entries indicative of states of the engine 102 for a last control loop, A is a matrix including constant values calibrated based on characteristics of the engine 102, x(k) is a vector with entries indicative of states of the engine 102 for the k-th control loop, B is a matrix including constant values calibrated based on characteristics of the engine 102, u(k−1) is a vector of including entries for the possible target values for the last control loop k−1.

How the components of the above relationships can be re-written for the example of the predicted parameters including predicted torque, predicted engine speed, and predicted MAP will now be described. The vector x(k+1) can be re-written as:

$$x(k+1)=\begin{bmatrix} x1(k+1) \\ x2(k+1) \\ x3(k+1) \end{bmatrix},$$

where x1(k+1) is a first state parameter of the engine 102 for the next control loop, x2(k+1) is a second state parameter of the engine 102 for the next control loop, and x3(k+1) is a third state parameter of the engine 102 for the next control loop.

The matrix A can be re-written as:

$$A = \begin{bmatrix} a11 & a12 & a13 \\ a21 & a22 & a23 \\ a31 & a32 & a33 \end{bmatrix}$$

where a11-a33 are constant values calibrated based on characteristics of the engine 102.

The vector x(k) can be re-written as:

$$x(k) = \begin{bmatrix} x1(k) \\ x2(k) \\ x3(k) \end{bmatrix},$$

where x1(k) is the first state parameter of the engine 102 for the k-th control loop, x2(k) is the second state parameter of the engine 102 for the k-th control loop, and x3(k) is the third state parameter of the engine 102 for k-th control loop. The entries of the vector x(k) are the entries of the vector x(k+1) calculated for the last control loop. The entries of the vector x(k+1) calculated for the k-th control loop are used for the next control loop as the entries of vector x(k).

The matrix B can be re-written as:

$$B = \begin{bmatrix} b11 & b12 & b13 & b14 & b15 & b16 & b17 & b18 \\ b21 & b22 & b23 & b24 & b25 & b26 & b27 & b28 \\ b31 & b32 & b33 & b34 & b35 & b36 & b37 & b38 \end{bmatrix}$$

where b11-b38 are constant values calibrated based on characteristics of the engine 102.

The vector u(k) can be re-written as:

$$u(k) = \begin{bmatrix} PTT(k) \\ PTWG(k) \\ PTEGR(k) \\ PTICP(k) \\ PTECP(k) \\ PTS(k) \\ PTN(k) \\ PTF(k) \end{bmatrix},$$

where PTT(k) is a possible target throttle opening of a possible sequence for the k-th one of the M future control loops, PTWG(k) is a possible target wastegate opening of the possible sequence for the k-th one of the M future control loops, PTEGR(k) is a possible target EGR opening of the possible sequence for the k-th one of the M future control loops, PTICP(k) is a possible target intake cam phasing value of the possible sequence for the k-th one of the M future control loops, and PTECP(k) is a possible target exhaust cam phasing value of the possible sequence for the k-th one of the M future control loops. PTS(k) is a possible target spark timing for the k-th one of the M future control loops, PTN(k) is a possible number of cylinders for the k-th one of the M future control loops, and PTF(k) includes possible fueling parameters for the k-th one of the M future control loops.

The vector y(k) can be re-written as:

$$y(k) = \begin{bmatrix} PT(k) \\ PRPM(k) \\ PMAP(k) \end{bmatrix},$$

where PT(k) is a predicted torque of the engine 102 for the k-th one of the M future control loops, PRPM(k) is a predicted engine speed for the k-th one of the M future control loops, and PMAP(k) is a predicted MAP for the k-th one of the M future control loops.

The matrix C can be re-written as:

$$C = \begin{bmatrix} c11 & c12 & c13 \\ c21 & c22 & c23 \\ c31 & c32 & c33 \end{bmatrix}$$

where c11-c33 are constant values calibrated based on characteristics of the engine 102.

The model 324 may include several different sets of the A, B, and C matrices for different operating conditions. The prediction module 323 may select which set of the A, B, and C matrices to use based on, for example, present engine speed, present engine load (e.g., torque), and/or one or more other parameters.

A cost module 332 determines a cost value for each of the possible sequences of the target values 230-244 based on comparisons of the predicted parameters determined for a possible sequence. An example cost determination is discussed further below. Each of the cost values reflects a "cost" associated with the use of that possible sequence of the target values 230-244 and can be compared with the other cost values to determine which one of the possible sequences of the target values 230-244 to use.

A selection module 344 selects one of the possible sequences of the target values 230-244 based on the costs of the possible sequences, respectively. For example, the selection module 344 may select the one of the possible sequences having the lowest cost while satisfying actuator constraints 348 and output constraints 352.

Satisfaction of the output constraints 352 may be considered in the cost determination. In other words, the cost module 332 may determine the cost values based on the output constraints 352. As discussed further below, based on how the cost values are determined, the selection module 344 may select the one of the possible sequences that best achieves the base torque request 308, while satisfying the actuator constraints 348 and the output constraints 352.

The selection module 344 may set the target values 230-244 to the first ones of the N values of the selected possible sequence, respectively. In other words, the selection module 344 sets the target wastegate opening area 230 to the first one of the N values in the sequence of N values for the target wastegate opening area 230, set the target throttle opening area 232 to the first one of the N values in the sequence of N values for the target throttle opening area 232, set the target EGR opening area 234 to the first one of the N values in the sequence of N values for the target EGR opening area 234, set the target intake cam phaser angle 236 to the first one of the N values in the sequence of N values for the target intake cam phaser angle 236, and set the target exhaust cam phaser angle 238 to the first one of the N values in the sequence of N values for the target exhaust cam phaser angle 238. The selection module 344 also sets the target spark timing 240 to the first one of the N values in the sequence of N values for the target spark timing 240, the target number of cylinders 242 to the first one of the N values in the sequence of N values for the target number of cylinders 242, and the target fueling parameters 244 to the first one of the N values in the sequence of N values for the target fueling parameters 244.

During a next control loop, the MPC module 312 identifies possible sequences, generates the predicted parameters for the possible sequences, determines the cost of each of the possible sequences, selects of one of the possible sequences, and sets of the target values 230-244 to the first set of the target values 230-244 in the selected possible sequence. This process continues for each control loop.

An actuator constraint module 360 (see FIG. 2) sets the actuator constraints 348 for each of the target values 230-244. In other words, the actuator constraint module 360 sets actuator constraints for the throttle valve 112, actuator constraints for the EGR valve 170, actuator constraints for the wastegate 162, actuator constraints for the intake cam phaser 148, and actuator constraints for the exhaust cam phaser 150. The actuator constraint module 360 may also set actuator constraints for the spark actuator module 126, actuator constraints for the cylinder actuator module 120, and actuator constraints for the fuel actuator module 124.

The actuator constraints 348 for each one of the target values 230-244 may include a maximum value for an associated target value and a minimum value for that target value. The actuator constraint module 360 may generally set the actuator constraints 348 to predetermined operational ranges for the associated engine actuators. More specifically, the actuator constraint module 360 may generally set the actuator constraints 348 to predetermined operational ranges for the throttle valve 112, the EGR valve 170, the wastegate 162, the intake cam phaser 148, the exhaust cam phaser 150, the spark actuator module 126, the cylinder actuator module 120, and the fuel actuator module 124, respectively.

An output constraint module 364 (see FIG. 2) sets the output constraints 352 for the predicted torque output of the engine 102 and the predicted MAP. The output constraints 352 for each one of the predicted parameters may include a maximum value for an associated predicted parameter for each of the M future control loops and a minimum value for that predicted parameter for each of the M future control loops. For example, the output constraints 352 include M maximum torques of the engine 102 for the next M future control loops, M minimum torques of the engine 102 for the M future control loops, M maximum MAPs for the next M future control loops, and M minimum MAPs for the next M future control loops, respectively.

A target engine speed module may generate a target engine speed trajectory. The target engine speed trajectory may include M target engine speeds for the next M future control loops, respectively. The target engine speed module varies the target engine speed trajectory under one or more circumstances. For example, the target engine speed module may vary the target engine speed trajectory for a gear shift of the transmission. The target engine speed module may, for example, generate the target engine speed trajectory to increase the engine speed for a downshift (e.g., third gear to second gear) of the transmission and to decrease the engine speed for an upshift (e.g., second gear to third gear) of the transmission. The transmission control module 194 may indicate upcoming gear shifts to the ECM 114.

Instead of or in addition to generating sequences of possible target values and determining the cost of each of the sequences, the MPC module 312 may identify a sequence of possible target values having the lowest cost using convex optimization techniques. For example, the MPC module 312 may determine the target values 230-244 using a quadratic programming (QP) solver, such as a Dantzig QP solver. In another example, the MPC module 312 may generate a surface of cost values for the possible sequences of the target values 230-244 and, based on the slope of the cost surface, identify a sequence of possible target values having the lowest cost. The MPC module 312 may then test that sequence of possible target values to determine whether that sequence of possible target values satisfies the actuator constraints 348. If so, the MPC module 312 may set the target values 230-244 to the first ones of the N values of that selected possible sequence, respectively, as discussed above.

If the actuator constraints 348 are not satisfied, the MPC module 312 selects another sequence of possible target values with a next lowest cost and tests that sequence of possible target values for satisfaction of the actuator constraints 348. The process of selecting a sequence and testing the sequence for satisfaction of the actuator constraints 348 may be referred to as an iteration. Multiple iterations may be performed during each control loop.

The MPC module 312 performs iterations until a sequence with the lowest cost that satisfies the actuator constraints 348 is identified. In this manner, the MPC module 312 selects the sequence of possible target values having the lowest cost while satisfying the actuator constraints 348 and the output constraints 352.

The cost module 332 may determine the cost for the possible sequences of the target values 230-244 based on relationships between: the predicted torque and the base torque request 308; and the predicted engine speeds and the target engine speeds of the target engine speed trajectory. The relationships may be weighted, for example, to control the effect that each of the relationships has on the cost.

For example only, the cost module 332 may determine the cost for a possible sequence of the target values 230-244 based on the following equation:

$$\text{Cost}=\sum_{i=1}^{N}\rho\epsilon^2+\|wT^*(TP_i-BTR_i)\|^2+\|wRPM^*(RPMP_i-TRPM_i)\|^2,$$

subject to the actuator constraints 348 and the output constraints 352. Cost is the cost value for the possible sequence of the target values 230-244, TPi is the predicted torque of the engine 102 for the i-th one of the next N control loops, BTRi is the base torque request 308 for the i-th one of the next N control loops, and wT is a weighting value associated with the relationship between the predicted torque and the base torque request. RPMPi is the predicted RPM for the i-th one of the N control loops, TRPMi is the one of the target engine speeds for the i-th one of the N control loops, and wRPM is a weighting value associated with the relationship between the predicted engine speeds and the target engine speeds of the target engine speed trajectory.

ρ is a weighting value associated with satisfaction of the output constraints 352. ϵ is a variable that the cost module 332 may set based on whether the output constraints 352 will be satisfied. The cost module 332 may increase E when a parameter is greater than or less than the corresponding minimum or maximum value (e.g., by at least a predetermined amount).

For example, the cost module 332 may increase E when one or more values of the predicted torque are greater than the maximum torque or less than the minimum torque for their respective control loops and/or when one or more values of the predicted MAP are greater than the maximum MAP or less than the maximum MAP for their respective control loops. In this manner, the cost for a possible sequence will increase when one or more of the output constraints 352 will not be satisfied. The cost module 332 may set ϵ to zero when all of the output constraints 352 are satisfied. ρ may be greater than the weighting value wT and the weighting value wRPM such that the cost determined for a possible sequence will be relatively large if one or more of the output constraints 352 are not satisfied. This may help to prevent the selection of a possible sequence where one or more of the output constraints 352 are not satisfied.

The cost module 332 may also vary the weighting value wRPM under some circumstances. For example, the cost module 332 may set the weighting value wRPM to a predetermined value that is greater than 0 when the target engine speed trajectory is to be used, such as for gear shifts of the transmission. The cost module 332 may set the weighting value wRPM to, for example, 0 or approximately 0 when the target engine speed trajectory is not to be used. When the weighting value wRPM is set to 0 or approximately zero, the relationship between the predicted engine speeds and the target engine speed trajectory will not affect or will have a minimal effect on the costs.

The weighting value wT may be greater than the predetermined value of the weighting value wRPM. In this manner, the relationship between the predicted engine torque and the base torque request 308 has a larger effect on the cost (than the relationship between the predicted engine speeds and the target engine speed trajectory) and, therefore, the selection of one of the possible sequences. The cost increases as the difference between the predicted engine torque and the base torque request 308 increases and vice versa.

While the example of determining predicted engine speed, determining the predicted engine torque, and controlling the engine actuators using the MPC module 312 is provided, the predicted engine speed and the predicted engine torque may be determined differently. For example, a prediction module (not shown) may determine predicted engine speed and predicted engine torque based on the accelerator pedal position. Predicted engine speed may be determined using one or more functions or mappings that relate accelerator pedal positions to predicted engine speeds, and predicted engine torque may be determined using one or more functions or mappings that relate accelerator pedal positions to predicted engine torque. Generally speaking, the prediction module may increase predicted engine speed and predicted engine torque as accelerator pedal position increases and vice versa.

Figure 4:
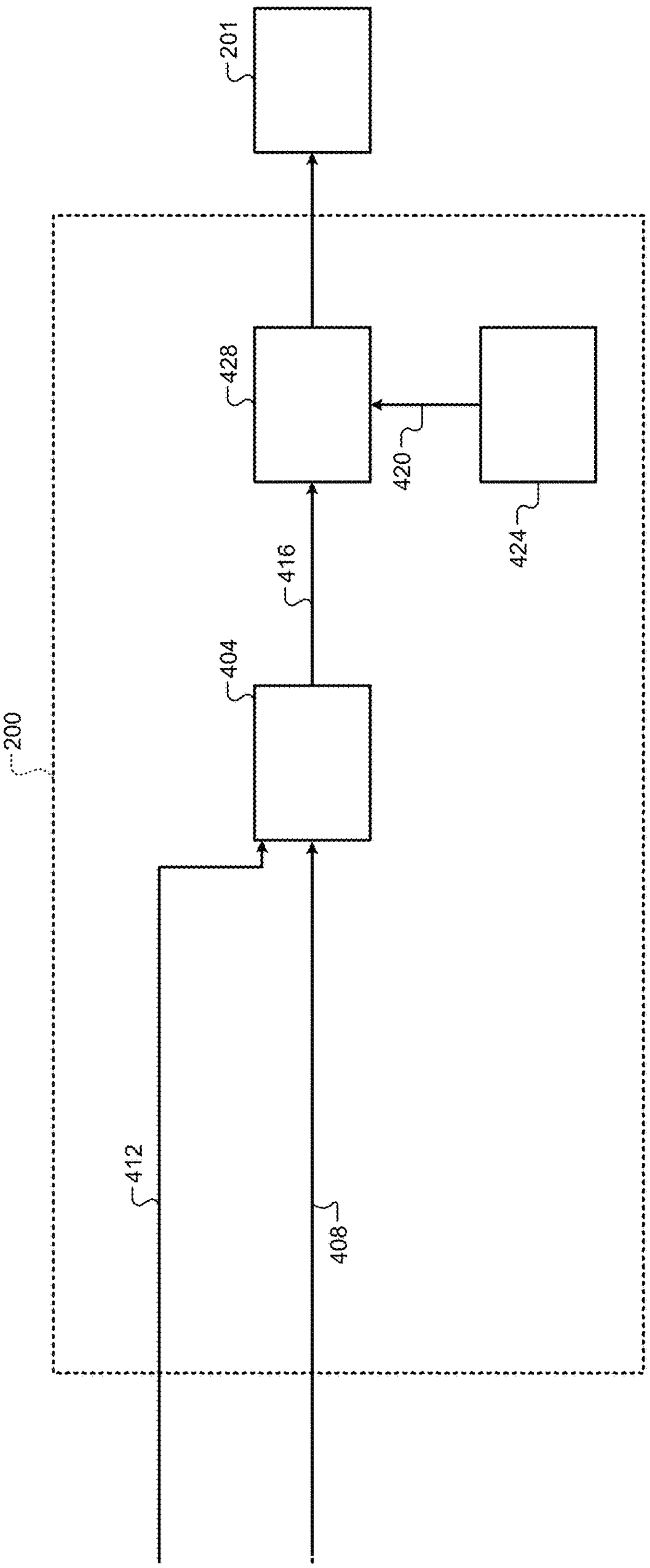
FIG. 4 is a functional block diagram including an example implementation of an audio control module.

FIG. 4 is a functional block diagram of an example audio system including the audio control module 200 and the speaker 201. The speaker 201 outputs sound, for example, within the passenger cabin of the vehicle and/or within the exhaust system 134 of the vehicle.

A sound control module 404 determines sound to output via the speaker 201 based on the predicted engine speed 408 and/or the predicted engine torque 412. The predicted engine speed 408 may be a predicted value of an actual engine speed of the engine 102 at one, two, three, four, or more control loops in the future. The predicted engine torque 412 may be a predicted value of an actual engine torque (output) of the engine 102 at one, two, three, four, or more control loops in the future. The MPC module 312 may determine the predicted engine speed 408 and the predicted engine torque 412 as discussed above (e.g., i=1, 2, 3, 4, . . . ). Alternatively, the prediction module may determine the predicted engine speed and the predicted engine torque based on accelerator pedal position, for example, using one or more functions or mappings that relate accelerator pedal positions to predicted engine speed and predicted engine torque. The prediction module may be implemented within the ECM 114 or within another module that is separate from the audio control module 200 and that communicates with the audio control module 200 via the CAN bus.

The accelerator pedal position may be measured using an accelerator pedal position sensor and may have a range between 0 and 100 percent. An accelerator pedal position of 0 percent may correspond to a steady-state position where the accelerator pedal rests when the driver is not applying pressure to the accelerator pedal. An accelerator pedal position of 100 percent may correspond to a position where the driver has actuated the accelerator pedal to a predetermined maximum extent. The accelerator pedal position may increase toward or to 100 percent when the driver applies pressure to the accelerator pedal and may decrease toward or to 0 percent when the driver releases the accelerator pedal.

Figure 5:
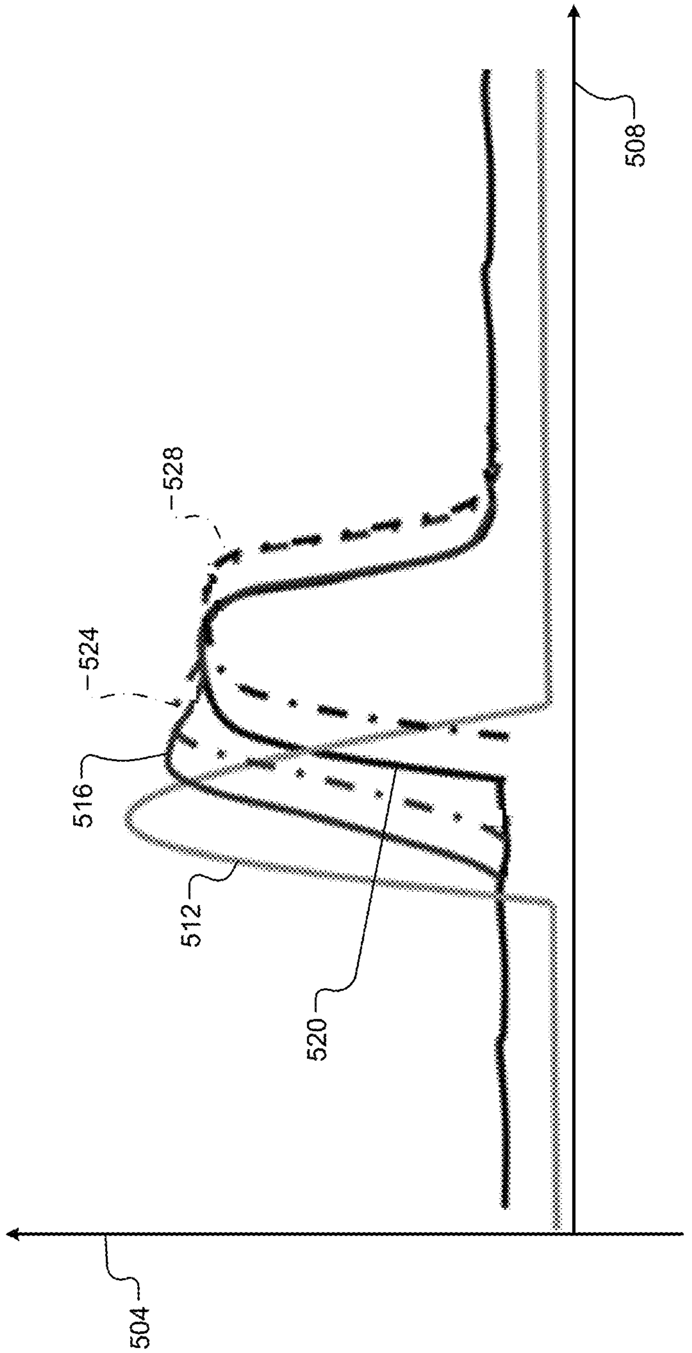
FIG. 5 is a graph of various predicted and measured parameters versus time.

FIG. 5 includes a graph of magnitude 504 of various parameters versus time 508. For example, FIG. 5 illustrates an increase in accelerator pedal position 512 when the driver applies pressure to the accelerator pedal. Generally speaking, the predicted engine speed 408 and the predicted engine torque 412 increase as the accelerator pedal position increases and vice versa, however, the rates of change may be non-linear.

Trace 516 tracks predicted engine speed in FIG. 5, and trace 520 tracks present (measured or actual) engine speed. As illustrated, the predicted engine speed 516 increases in response to the increase in the accelerator pedal position 512. The present engine speed 520 also increases in response to the increase in the accelerator pedal position 512, albeit after the predicted engine speed 516 increases. The ECM 114 determines the present engine speed 520 based on crankshaft position measured using the crankshaft position sensor 180, such as a period between two crankshaft positions measured using the crankshaft position sensor 180.

A delay between an increase in the accelerator pedal position 512 and a resulting increase in the present engine speed 520 may be attributable to, for example, delays of the ECM 114, delays of the engine actuators themselves, and delays in the engine 102 ingesting additional air to increase torque output and increase the present engine speed 520. As stated above and as illustrated, however, the predicted engine speed 516 increases sooner than the present engine speed 520 in response to an increase in the accelerator pedal position 512.

Traces 524 and 528 track the predicted engine speed 408 and the present engine speed, respectively, when used by the sound control module 404 for outputting engine sound. As described above, the predicted engine speed 408 and the present engine speed are determined by the ECM 114 and transmitted to the audio control module 200 via the CAN. As such, the predicted engine speed 524 (used by the sound control module 404) is delayed relative to the predicted engine speed 516 (when determined by the ECM 114). Similarly, the present engine speed 528 (when it could be used by the sound control module 404) is delayed relative to the present engine speed 520 (when determined by the ECM 114). The same is true for the predicted engine torque 412 as the predicted engine torque 412 is determined by the ECM 114. These delays are attributable to the communication of the parameters from the ECM 114 to the audio control module 200.

The sound control module 404 could control sound generation based on the present engine speed. The combination of the delays may cause customer dissatisfaction as the engine sound generated by the audio control module 200 may be delayed relative to driver actuation of the accelerator pedal. A driver may expect engine sound to be generated sooner after the actuation of the accelerator pedal than if the engine sound is generated based on the present engine speed.

The sound control module 404 therefore sets characteristics 416 of one or more predetermined engine sounds 420 to output based on at least one of the predicted engine speed 408 and the predicted engine torque 412. The characteristics 416 may include, for example, one or more harmonics or orders of a base frequency at which to output each of the one or more predetermined engine sounds 420. The characteristics 416 may also include respective magnitudes for outputting each of the one or more predetermined engine sounds 420 at the respective harmonics or orders. In other words, for each of the one or more predetermined engine sounds 420, the sound control module 404 may set one or more frequencies (e.g., harmonics or orders of the base frequency) at which to output that one of the predetermined engine sounds 420 and one or more magnitudes (for the one or more frequencies, respectively) for outputting that one of the predetermined engine sounds 420. The base frequency may be a predetermined fixed frequency, such as 110 Hz, or a variable, such as a frequency corresponding to the present engine speed or the predicted engine speed 408. Sound files of the predetermined engine sound(s) 420 (or tones) are stored in memory, such as in sound memory 424.

As stated above, the sound control module 404 sets the characteristics 416 based on at least one of the predicted engine speed 408 and the predicted engine torque 412. The sound control module 404 may set the characteristics 416 using one or more mappings (e.g., lookup tables) that relate predicted engine speed and/or predicted engine torque to frequencies and magnitudes for each of the predetermined engine sound(s) 420.

For example, the sound control module 404 may increase the number of frequencies (e.g., harmonics or orders of the base frequency) of one or more of the predetermined engine sounds 420 as the predicted engine speed 408 increases and vice versa. As an example only, the sound control module 404 may set the characteristics 416 to output one of the predetermined engine sounds 420 at three different harmonics of the base frequency when the predicted engine speed 408 is a first speed and set the characteristics 416 to output the one of the predetermined engine sounds 420 at four or more different harmonics of the base frequency when the predicted engine speed 408 is a second speed that is greater than the first speed.

Additionally or alternatively, the sound control module 404 may increase one or more frequencies (e.g., harmonics or orders of the base frequency) of one or more of the predetermined engine sounds 420 as the predicted engine speed 408 increases and vice versa. As an example only, the sound control module 404 may set the characteristics 416 to output one of the predetermined engine sounds 420 at first, third, and fifth harmonics when the predicted engine speed 408 is a first speed. The sound control module 404 may set the characteristics 416 to output the one of the predetermined engine sounds 420 at, for example, first, third, and sixth harmonics of the base frequency, at second, third, and sixth harmonics of the base frequency, or at one or more other harmonics that are greater than those used for the first speed when the predicted engine speed 408 is a second speed that is greater than the first speed.

Additionally or alternatively, the sound control module 404 may increase the number of frequencies (e.g., harmonics or orders of the base frequency) of one or more of the predetermined engine sounds 420 as the predicted engine torque 412 increases and vice versa. As an example only, the sound control module 404 may set the characteristics 416 to output one of the predetermined engine sounds 420 at three different harmonics of the base frequency when the predicted engine torque 412 is a first torque and set the characteristics 416 to output the one of the predetermined engine sounds 420 at four or more different harmonics of the base frequency when the predicted engine torque 412 is a second torque that is greater than the first torque.

Additionally or alternatively, the sound control module 404 may increase one or more frequencies (e.g., harmonics or orders of the base frequency) of one or more of the predetermined engine sounds 420 as the predicted engine torque 412 increases and vice versa. As an example only, the sound control module 404 may set the characteristics 416 to output one of the predetermined engine sounds 420 at first, third, and fifth harmonics when the predicted engine torque 412 is a first torque. The sound control module 404 may set the characteristics 416 to output the one of the predetermined engine sounds 420 at, for example, first, third, and sixth harmonics of the base frequency, at second, third, and sixth harmonics of the base frequency, or at one or more other harmonics that are greater than those used for the first torque when the predicted engine torque 412 is a second torque that is greater than the first torque.

Additionally or alternatively, the sound control module 404 may increase the magnitude for outputting one or more of the predetermined engine sounds 420 at one or more frequencies (e.g., harmonics or orders of the base frequency) as the predicted engine speed 408 increases and vice versa. As an example only, the sound control module 404 may set the characteristics 416 to output one of the predetermined engine sounds 420 at a first magnitude at a first harmonic of the base frequency when the predicted engine speed 408 is a first speed. The sound control module 404 may set the characteristics 416 to output the one of the predetermined engine sounds 420 at a second magnitude (greater than the first magnitude) at the first harmonic of the base frequency when the predicted engine speed 408 is a second speed that is greater than the first speed. While the example of increasing one magnitude of one frequency for one of the predetermined engine sounds 420 is provided, the sound control module 404 may increase the magnitude for one or more of the frequencies for one or multiple of the predetermined engine sounds 420.

Additionally or alternatively, the sound control module 404 may increase the magnitude for outputting one or more of the predetermined engine sounds 420 at one or more frequencies (e.g., harmonics or orders of the base frequency) as the predicted engine torque 412 increases and vice versa. As an example only, the sound control module 404 may set the characteristics 416 to output one of the predetermined engine sounds 420 at a first magnitude at a first harmonic of the base frequency when the predicted engine torque 412 is a first torque. The sound control module 404 may set the characteristics 416 to output the one of the predetermined engine sounds 420 at a second magnitude (greater than the first magnitude) at the first harmonic of the base frequency when the predicted engine torque 412 is a second torque that is greater than the first torque. While the example of increasing one magnitude of one frequency for one of the predetermined engine sounds 420 is provided, the sound control module 404 may increase the magnitude for one or more of the frequencies for one or multiple of the predetermined engine sounds 420.

Generally speaking, loudness of an output sound may increase as the number of frequencies used increases and/or as the magnitude of one or more frequencies used increases. Loudness may decrease as the number of frequencies used decreases and/or the magnitude of one or more frequencies decreases.

An audio driver module 428 receives the characteristics 416 and the predetermined engine sound(s) 420. The audio driver module 428 applies power (e.g., from the one or more other batteries) to the speaker 201 to output the predetermined engine sound(s) 420 at the respective frequencies and magnitudes specified by the sound control module 404.

FIG. 6 is a flowchart depicting an example method of generating engine sound. Control begins with 604 where the ECM 114 (e.g., the prediction module or the MPC module 312) determines the predicted engine speed 408 and the predicted engine torque 412 based on the accelerator pedal position. The ECM 114 controls one or more of the engine actuators based on the predicted engine speed 408 and/or the predicted engine torque 412.

At 608, the ECM 114 transmits the predicted engine speed 408 and the predicted engine torque 412 to the CAN bus, and the audio control module 200 receives the predicted engine speed 408 and/or the predicted engine torque 412 via the CAN bus. At 612, the sound control module 404 sets the characteristics 416 for outputting the predetermined engine sound(s) 420 based on at least one of the predicted engine speed 408 and the predicted engine torque 412. More specifically, based on at least one of the predicted engine speed 408 and the predicted engine torque 412, the sound control module 404 determines which one or more of the predetermined engine sounds 420 to output, frequencies (e.g., harmonics or orders of the base frequency) for outputting each of the one or more of the predetermined engine sounds 420, and magnitudes for each of the frequencies for outputting the one or more of the predetermined engine sounds 420. At 616, the audio driver module 428 applies power to the speaker 201 to output the predetermined engine sound(s) 420 at the respective frequencies and magnitudes specified by the sound control module 404. While the example of FIG. 6 is shown and discussed as ending, FIG. 6 is illustrative of one control loop and control may return to 604 for a next control loop. Control loops may be executed at a predetermined rate, although the ECM 114 may execute control loops at a different (e.g., more frequent) rate than the audio control module 200. In other words, 604 and 608 may be executed at a different (e.g., more frequent) rate than 612 and 616.

While the present application is discussed in conjunction with the speaker 201, the present application is also applicable to applying power to a vibrating device (e.g., that vibrates a seat, a floor, etc. of the vehicle) causing the vibrating device to vibrate according to the characteristics 416. Also, in addition to the use of predicted engine speed and/or predicted engine torque, a predicted gear of the transmission may be used. For example, a plurality of lookup tables (of characteristics indexed by predicted engine speed and/or predicted engine torque) may be stored for a plurality of different gears of the transmission. The sound control module 404 may select the one of the lookup tables for the predicted gear of the transmission, and set the characteristics 416 based on the predicted engine speed 408 and/or the predicted engine torque 412 using the selected one of the lookup tables.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An engine sound enhancement system of a vehicle, comprising:

an engine control module (ECM) configured to:

based on an accelerator pedal position measured using an accelerator pedal position sensor, determine at least one of a predicted engine speed and a predicted torque output of an engine;

selectively actuate at least one engine actuator of the vehicle based on the at least one of the predicted engine speed and the predicted torque output; and transmit the at least one of the predicted engine speed and the predicted engine speed to a network bus; and an audio control module that is separate from the ECM and that is configured to:

obtain the at least one of the predicted engine speed and the predicted torque output from the network bus;

based on the at least one of the predicted engine speed and the predicted torque output, set at least one of:

(i) a frequency at which to output a predetermined engine sound; and (ii) a magnitude for outputting the predetermined engine sound at the frequency; and apply power to at least one speaker of the vehicle to output the predetermined engine sound at the frequency and the magnitude.

2. The engine sound enhancement system of claim 1 wherein the at least one speaker outputs sound within a passenger cabin of the vehicle.

3. The engine sound enhancement system of claim 1 wherein the audio control module is configured to:

when the predicted engine speed is a first engine speed, set:

(i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed, set:

(i) the frequency at which to output the predetermined engine sound to a second frequency that is greater than the second frequency; and (ii) the magnitude for outputting the predetermined engine sound at the frequency to the first magnitude.

4. The engine sound enhancement system of claim 1 wherein the audio control module is configured to:

when the predicted torque output is a first torque, set:

(i) the frequency at which to output the predetermined engine sound to a first frequency; and (ii) the magnitude for outputting the predetermined engine sound at the frequency to a first magnitude; and when the predicted torque output is a second torque that is greater than the first torque, set:

(i) the frequency at which to output the predetermined engine sound to a second frequency that is greater than the second frequency; and (ii) the magnitude for outputting the predetermined engine sound at the frequency to the first magnitude.

5. The engine sound enhancement system of claim 1 wherein the audio control module is configured to:

when the predicted engine speed is a first engine speed, set:

(i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed, set:

(i) the frequency at which to output the predetermined engine sound to the first frequency; and (ii) the magnitude for outputting the predetermined engine sound at the frequency to a second magnitude that is greater than the first magnitude.

6. The engine sound enhancement system of claim 1 wherein the audio control module is configured to:

when the predicted torque output is a first torque, set:

(i) the frequency at which to output the predetermined engine sound to a first frequency; and (ii) the magnitude for outputting the predetermined engine sound at the frequency to a first magnitude; and when the predicted torque output is a second torque that is greater than the first torque, set:

(i) the frequency at which to output the predetermined engine sound to the first frequency; and (ii) the magnitude for outputting the predetermined engine sound at the frequency to a second magnitude that is greater than the first magnitude.

7. The engine sound enhancement system of claim 1 wherein the audio control module is configured to:

when the predicted engine speed is a first engine speed, set:

(i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed:

(i) set the frequency at which to output the predetermined engine sound to the first frequency;

(ii) set the magnitude for outputting the predetermined engine sound at the frequency to the first magnitude;

(iii) set a second frequency at which to output the predetermined engine sound to greater than the first frequency;

(iv) set a second magnitude for outputting the predetermined engine sound at the second frequency; and (v) apply power to the at least one speaker of the vehicle to output the predetermined engine sound further at the second frequency and the second magnitude.

8. The engine sound enhancement system of claim 1 wherein the audio control module is configured to:

when the predicted torque output is a first torque, set:

(i) the frequency at which to output the predetermined engine sound to a first frequency; and (ii) the magnitude for outputting the predetermined engine sound at the frequency to a first magnitude; and when the predicted torque output is a second torque that is greater than the first torque:

(i) set the frequency at which to output the predetermined engine sound to the first frequency;

(ii) set the magnitude for outputting the predetermined engine sound at the frequency to the first magnitude;

(iii) set a second frequency at which to output the predetermined engine sound to greater than the first frequency;

(iv) set a second magnitude for outputting the predetermined engine sound at the second frequency; and (v) apply power to the at least one speaker of the vehicle to output the predetermined engine sound further at the second frequency and the second magnitude.

9. The engine sound enhancement system of claim 1 wherein the audio control module is configured to:

when the predicted engine speed is a first engine speed, set:

(i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed, set:

(i) the frequency at which to output the predetermined engine sound to a second frequency that is greater than the second frequency; and (ii) the magnitude for outputting the predetermined engine sound at the frequency to a second magnitude that is greater than the first magnitude.

10. The engine sound enhancement system of claim 1 wherein the ECM is configured to:

determine a measured engine speed based on a crankshaft position measured using a crankshaft position sensor;

actuate the at least one engine actuator to change the measured engine speed in response to a change in the accelerator pedal position; and before the change in the measured engine speed, in response to the change in the accelerator pedal position, change the at least one of the predicted engine speed and the predicted torque output.

11. An engine sound enhancement method for a vehicle, comprising:

by an engine control module (ECM):

based on an accelerator pedal position measured using an accelerator pedal position sensor, determining at least one of a predicted engine speed and a predicted torque output of an engine;

selectively actuating at least one engine actuator of the vehicle based on the at least one of the predicted engine speed and the predicted torque output; and transmitting the at least one of the predicted engine speed and the predicted engine speed to a network bus; and by an audio control module that is separate from the ECM:

obtaining the at least one of the predicted engine speed and the predicted torque output from the network bus;

based on the at least one of the predicted engine speed and the predicted torque output, setting at least one of:

(i) a frequency at which to output a predetermined engine sound; and (ii) a magnitude for outputting the predetermined engine sound at the frequency; and applying power to at least one speaker of the vehicle to output the predetermined engine sound at the frequency and the magnitude.

12. The engine sound enhancement method of claim 11 wherein the at least one speaker outputs sound within a passenger cabin of the vehicle.

13. The engine sound enhancement method of claim 11 wherein setting at least one of (i) the frequency at which to output a predetermined engine sound and (ii) the magnitude for outputting the predetermined engine sound at the frequency includes:

when the predicted engine speed is a first engine speed, setting:

(i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed, setting:

(i) the frequency at which to output the predetermined engine sound to a second frequency that is greater than the second frequency; and (ii) the magnitude for outputting the predetermined engine sound at the frequency to the first magnitude.

14. The engine sound enhancement method of claim 11 wherein setting at least one of (i) the frequency at which to output a predetermined engine sound and (ii) the magnitude for outputting the predetermined engine sound at the frequency includes:

when the predicted torque output is a first torque, setting:

(i) the frequency at which to output the predetermined engine sound to a first frequency; and (ii) the magnitude for outputting the predetermined engine sound at the frequency to a first magnitude; and when the predicted torque output is a second torque that is greater than the first torque, setting:

(i) the frequency at which to output the predetermined engine sound to a second frequency that is greater than the second frequency; and (ii) the magnitude for outputting the predetermined engine sound at the frequency to the first magnitude.

15. The engine sound enhancement method of claim 11 wherein setting at least one of (i) the frequency at which to output a predetermined engine sound and (ii) the magnitude for outputting the predetermined engine sound at the frequency includes:

when the predicted engine speed is a first engine speed, setting:

(i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed, setting:

(i) the frequency at which to output the predetermined engine sound to the first frequency; and (ii) the magnitude for outputting the predetermined engine sound at the frequency to a second magnitude that is greater than the first magnitude.

16. The engine sound enhancement method of claim 11 wherein setting at least one of (i) the frequency at which to output a predetermined engine sound and (ii) the magnitude for outputting the predetermined engine sound at the frequency includes:

when the predicted torque output is a first torque, setting:

(i) the frequency at which to output the predetermined engine sound to a first frequency; and (ii) the magnitude for outputting the predetermined engine sound at the frequency to a first magnitude; and when the predicted torque output is a second torque that is greater than the first torque, setting:

(i) the frequency at which to output the predetermined engine sound to the first frequency; and (ii) the magnitude for outputting the predetermined engine sound at the frequency to a second magnitude that is greater than the first magnitude.

17. The engine sound enhancement method of claim 11 wherein setting at least one of (i) the frequency at which to output a predetermined engine sound and (ii) the magnitude for outputting the predetermined engine sound at the frequency includes:

when the predicted engine speed is a first engine speed, setting:

(i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed:

(i) setting the frequency at which to output the predetermined engine sound to the first frequency;

(ii) setting the magnitude for outputting the predetermined engine sound at the frequency to the first magnitude;

(iii) setting a second frequency at which to output the predetermined engine sound to greater than the first frequency;

(iv) setting a second magnitude for outputting the predetermined engine sound at the second frequency; and (v) applying power to the at least one speaker of the vehicle to output the predetermined engine sound further at the second frequency and the second magnitude.

18. The engine sound enhancement method of claim 11 wherein setting at least one of (i) the frequency at which to output a predetermined engine sound and (ii) the magnitude for outputting the predetermined engine sound at the frequency includes:

when the predicted torque output is a first torque, setting:

(i) the frequency at which to output the predetermined engine sound to a first frequency; and (ii) the magnitude for outputting the predetermined engine sound at the frequency to a first magnitude; and when the predicted torque output is a second torque that is greater than the first torque:

(i) setting the frequency at which to output the predetermined engine sound to the first frequency;

(ii) setting the magnitude for outputting the predetermined engine sound at the frequency to the first magnitude;

(iii) setting a second frequency at which to output the predetermined engine sound to greater than the first frequency;

(iv) setting a second magnitude for outputting the predetermined engine sound at the second frequency; and (v) applying power to the at least one speaker of the vehicle to output the predetermined engine sound further at the second frequency and the second magnitude.

19. The engine sound enhancement method of claim 11 wherein setting at least one of (i) the frequency at which to output a predetermined engine sound and (ii) the magnitude for outputting the predetermined engine sound at the frequency includes:

when the predicted engine speed is a first engine speed, setting:

(i) the frequency at which to output the predetermined engine sound to a first frequency; and (ii) the magnitude for outputting the predetermined engine sound at the frequency to a first magnitude; and when the predicted engine speed is a second engine speed that is greater than the first engine speed, setting:

(i) the frequency at which to output the predetermined engine sound to a second frequency that is greater than the second frequency; and (ii) the magnitude for outputting the predetermined engine sound at the frequency to a second magnitude that is greater than the first magnitude.

20. The engine sound enhancement method of claim 11 further comprising, by the ECM:

determining a measured engine speed based on a crankshaft position measured using a crankshaft position sensor;

actuating the at least one engine actuator to change the measured engine speed in response to a change in the accelerator pedal position; and before the change in the measured engine speed, in response to the change in the accelerator pedal position, changing the at least one of the predicted engine speed and the predicted torque output.

* * * * *